(No Model.)
R. R. BURROWS.
BEET PULLER.
No. 361,205. Patented Apr. 12, 1887.
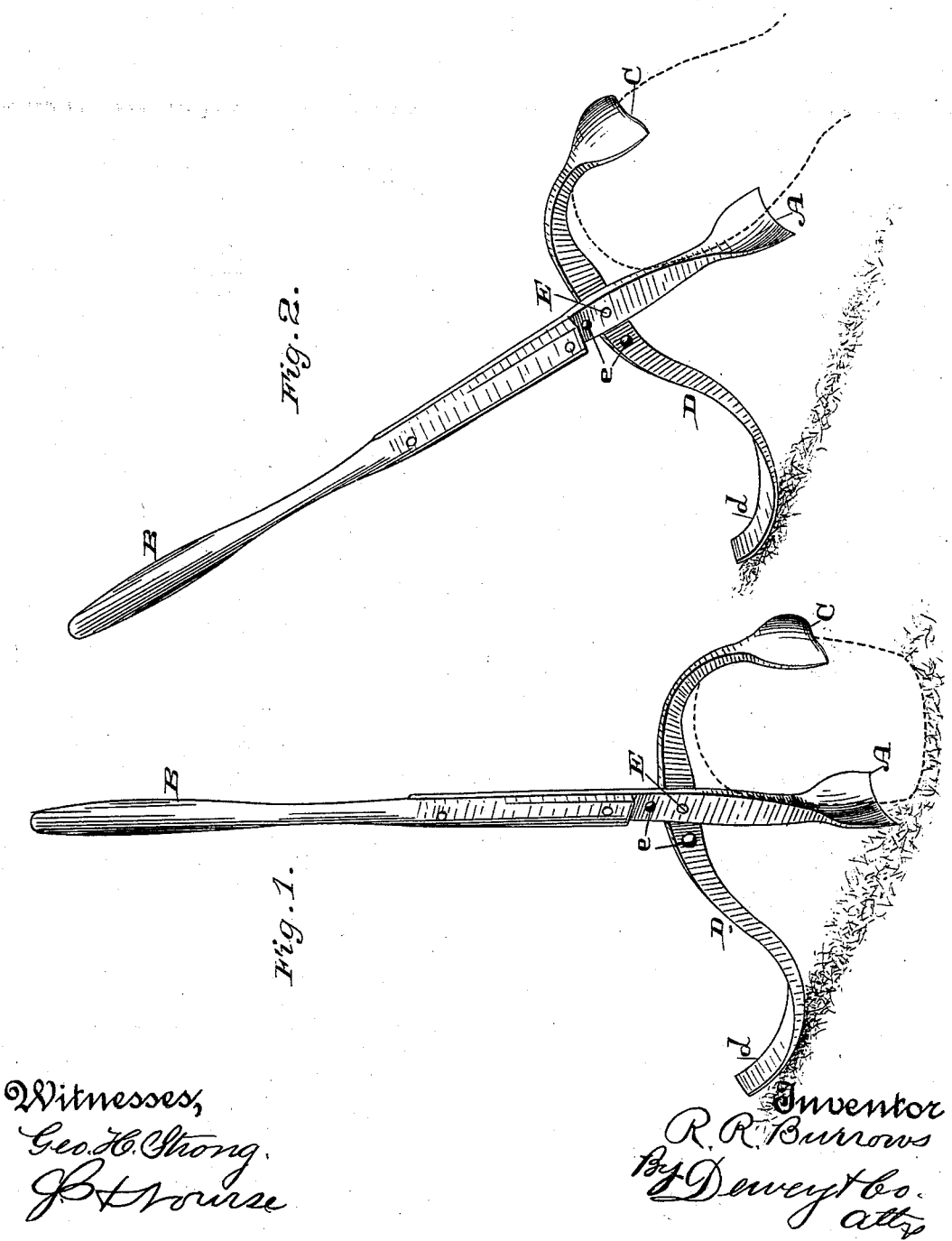

UNITED STATES PATENT OFFICE.

ROBERT ROMAIN BURROWS, OF POTTER VALLEY, CALIFORNIA.

BEET-PULLER.

SPECIFICATION forming part of Letters Patent No. 361,205, dated April 12, 1887.

Application filed January 29, 1887. Serial No. 225,922. (No model.)

*To all whom it may concern:*

Be it known that I, ROBERT ROMAIN BURROWS, of Potter Valley, in the county of Mendocino and State of California, have invented an Improvement in Beet-Pullers; and I hereby declare the following to be a full, clear, and exact description thereof.

My invention relates to the class of garden implements, and especially to those adapted for the pulling of those vegetables having roots or bulbs which grow in or partially in the ground—such as beets, turnips, carrots, &c.

My invention consists in a handled blade adapted for gripping one side of the vegetable and a peculiarly-curved fulcrum-lever pivoted to the main handle or blade and having a blade adapted for gripping and binding on the other side of the vegetable, as I shall hereinafter fully describe.

The object of my invention is to provide a simple and effective beet or other vegetable puller.

Referring to the accompanying drawings, Figure 1 is a perspective view of my beet-puller, showing its primary adjustment to a beet. Fig. 2 is a view showing its action in pulling the beet out of the ground.

A is the main blade, having, preferably, a shape widening to its lower edge and a concave face, the better to conform to the contour of the beet or vegetable. The blade is properly secured to or formed with a handle, B, of a length sufficient to permit it to be easily operated.

C is the gripping-blade, which may appropriately be termed the "grapple." It has a widening shape and a concave face similar to blade A. It is formed with or connected to a lever, D, having an ogee shape, the part lettered *d* being the foot. This lever is pivoted at E to the main handle, or to the shank of the blade A, which joins the handle.

The use of the implement is as follows: The blade A is placed against the near side of the beet, Fig. 1, with the handle B approaching to or in an upright position. The blade C lies on the farther side of the beet, while the ogee-lever D curves over its top, and its foot *d* rests on the ground and forms the fulcrum. Now, the handle B is pressed down, Fig. 2, so as to force the blade A against the beet. This movement throws the weight upon the foot *d* of the ogee-lever D, so that its blade C is pressed against and binds on the other side of the beet, thereby gripping it between the two blades. As the pressure on the handle continues the gripping force becomes stronger, and with the foot *d* as a fulcrum the beet is pried out of the ground. When a vegetable which grows deeper in the ground is to be extracted, the implement is elevated above it and the blade A is driven in on one side of it, while the blade C falls on the other side. The prying of the blade A will then cause the proper engagement of the blade C, as before. In order to vary the leverage and capacity of the implement, I may provide for a change of the pivotal connection between the parts by removing the pivot-pin into different holes. (Shown at *e*.)

I am aware of a root-puller having two blades with handles pivoted together, said handles being of equal length and operating similar to a pair of tongs to effect the gripping of their blades. I am also aware of a weed-puller the gripping-blade of which is operated by a cord or wire guided upwardly beside the main handle. The distinction between these implements and mine lies in the employment of an ogee-lever which enables its foot to act as a fulcrum, and concave blades adapted to enter the ground and grasp the root or vegetable.

Having thus described my invention, what I claim as new, and desire to secure by Letters Patent, is—

The combination, in a beet or vegetable puller, of the concave blade A, for gripping one side of the beet or other vegetable, a handle, B, formed or connected with said blade, a concave blade, C, for gripping the other side of the beet or other vegetable, and the ogee-lever D, formed or connected with the blade C, pivoted to the handle or other blade and having its free end or foot *d* resting on the ground and acting as a fulcrum, substantially as herein described.

In witness whereof I have hereunto set my hand.

ROBERT ROMAIN BURROWS.

Witnesses:
D. A. BOGLE,
J. S. HUNTER.